March 17, 1931.  F. L. BROWN  1,797,070
PIE MARKER
Filed March 14, 1928
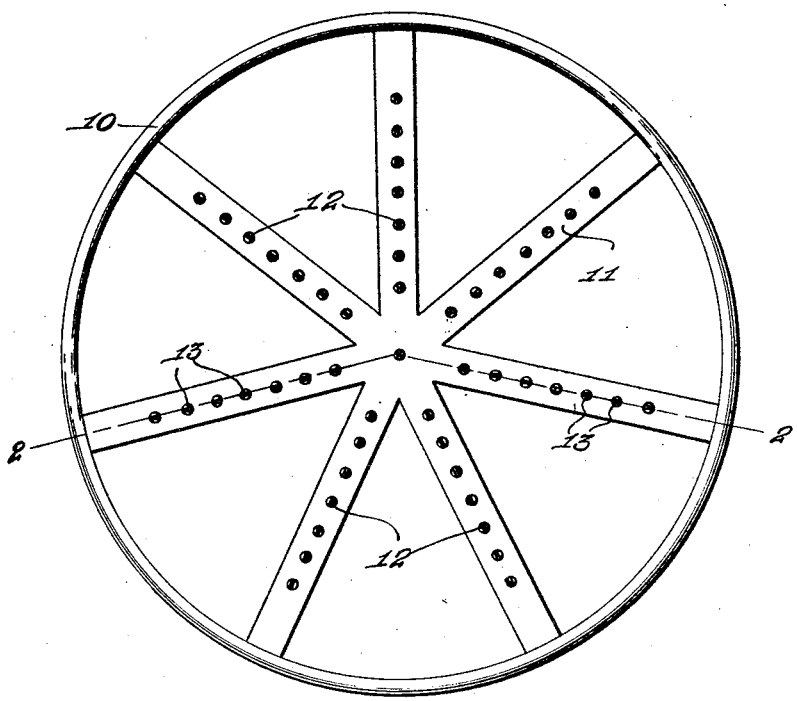
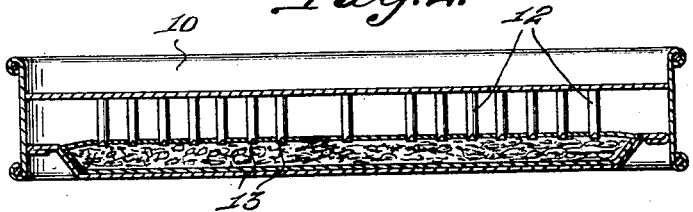
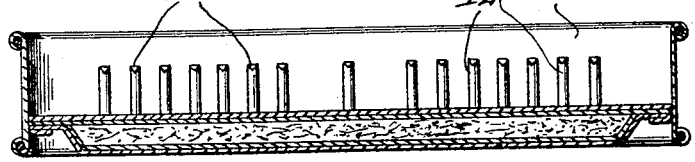
Frederick L. Brown, INVENTOR
BY Victor J. Evans
ATTORNEY
WITNESS:

Patented Mar. 17, 1931

1,797,070

UNITED STATES PATENT OFFICE

FREDRICK LEWIS BROWN, OF WEST PALM BEACH, FLORIDA

PIE MARKER

Application filed March 14, 1928. Serial No. 261,569.

This invention relates to culinary articles and has for an object the provision of a device for marking pies, either before or after baking, so as to provide a guide to aid in cutting the pie into equal parts, the invention being especially adapted for restaurants and other public eating establishments, although it may also be used to advantage in private households.

Another object of the invention is the provision of a device of the above character which may be used in cutting strips of dough to be placed upon the tops of pies not intended to have solid top crusts, the device being also useful in placing these strips in position.

Another object of the invention is the provision of a pie marking device, which in addition to the above and other advantageous features, includes means for guiding the marker when the latter is in use, and for spacing the marking or crust penetrating elements from a table or support, when the device is not in use.

With the above and other objects in view, the invention further includes the following novel features and details of construction, to be hereinafter more fully described, illustrated in the accompanying drawing and pointed out in the appended claim.

In the drawing:—

Figure 1 is a plan view of the invention.

Figure 2 is a sectional view showing the use of the invention as a marker.

Figure 3 is a like view illustrating the manner of using the invention for applying dough strips to the top of the pie.

Referring to the drawing in detail wherein like characters of reference denote corresponding parts, the reference character 10 indicates a frame which is of circular form and is adapted to be conveniently placed around a pie pan, the frame 10 being designed to act as a guide for marking or penetrating elements to be later described.

Secured to and extending inwardly within the frame are arms or bars 11. These arms or bars are connected at their inner ends or centrally within the frame, while the outer ends of the bars or arms are spaced inwardly from the opposite edges of the frame. Extending inwardly from the arms or bars 11 are spaced penetrating elements or pins 12. These pins extend at right angles from the arms and their outer ends are pointed as indicated at 13 so that they may be readily forced into the top of a pie either before or after baking.

Any desired number of arms may be employed, the purpose being to provide devices having a different number of arms so that the particular device used may be selected according to the number of pieces into which the pie is to be cut.

The guide frame 10 is adapted to be placed around a pie pan, as shown in Figure 2 of the drawing and the length of the penetrating pins is such that when the lower edge of the device is flush or substantially flush with the bottom of the pan, the penetrating pins will be forced into the top crust of the pie and the latter will be marked to indicate where the cuts are to be made.

The device may also be used for pies having only strips of dough upon the top, which strips may be placed upon the smooth face of the arms or bars and cut to a size corresponding with the width of these arms. The device may then be reversed and the strips applied to the top of the pie as shown in Figure 3 of the drawing.

By arranging the arms and the penetrating elements within the frame or ring 10, these pins will not be in contact with the table or support upon which the device is placed.

The device may be advantageously used in bakeries, the perforations made by the marker not only permitting of the escape of steam, but also acting to divide the pie into the desired number of cuts, according to the wishes of a customer.

The invention is susceptible of various changes in its form, proportions and minor details of construction and the right is herein reserved to make such changes as properly fall within the scope of the appended claim.

Having described the invention what is claimed is:—

A device of the character described comprising a ring-like member adapted to fit around the edges of a pie pan, and capable of being reversed to arrange either edge lowermost, a plurality of radially disposed arms secured to the inner periphery of the member and having their inner ends connected together, said arms being arranged slightly beneath one edge of the ring like member and presenting an unobstructed upper surface adapted to support strips of dough constituting the pie top, and to arrange said strips upon the top of the pie when the ring-like member is in one position, and a plurality of penetrating elements depending from the lower surface of each arm and terminating inwardly of the adjacent edge of the ring-like member and utilized to penetrate the crust of the pie when the ring-like member is reversed.

In testimony whereof I affix my signature.

FREDRICK LEWIS BROWN.